United States Patent
Amimoto et al.

(10) Patent No.: US 8,659,721 B2
(45) Date of Patent: Feb. 25, 2014

(54) LIQUID CRYSTAL DISPLAY DEVICE HAVING REFLECTING SURFACE IN ZIGZAG MANNER WITH POLYGONAL LINE

(75) Inventors: Toshiyuki Amimoto, Gunma (JP); Masaki Tsubokura, Chiba (JP); Tomohiro Maeyama, Kanagawa (JP)

(73) Assignee: Panasonic Liquid Crystal Display Co., Ltd., Osaka (JP)

( * ) Notice: Subject to any disclaimer, the term of this patent is extended or adjusted under 35 U.S.C. 154(b) by 517 days.

(21) Appl. No.: 12/950,606

(22) Filed: Nov. 19, 2010

(65) Prior Publication Data

US 2011/0122349 A1   May 26, 2011

(30) Foreign Application Priority Data

Nov. 25, 2009   (JP) ................................. 2009-267949

(51) Int. Cl.
*G02F 1/1335*   (2006.01)
*F21V 7/04*   (2006.01)
*F21V 5/00*   (2006.01)

(52) U.S. Cl.
USPC ................... 349/67; 349/61; 349/69; 349/70; 349/71; 362/559; 362/560; 362/561

(58) Field of Classification Search
USPC .......... 349/61, 69–71, 67; 362/612, 611, 614, 362/617, 618, 623, 559–561; 345/84, 87
See application file for complete search history.

(56) References Cited

U.S. PATENT DOCUMENTS

| | | | | |
|---|---|---|---|---|
| 5,034,864 A | * | 7/1991 | Oe | 362/224 |
| 7,562,990 B2 | * | 7/2009 | Maeda et al. | 359/515 |
| 7,969,503 B2 | * | 6/2011 | Sladen | 348/371 |
| 2006/0268576 A1 | * | 11/2006 | Matsui et al. | 362/613 |
| 2007/0103935 A1 | | 5/2007 | Masuyama et al. | |

FOREIGN PATENT DOCUMENTS

| | | |
|---|---|---|
| JP | 63-024280 | 2/1988 |
| JP | 63-074087 | 4/1988 |
| JP | 2-136829 | 5/1990 |
| JP | 2002-196326 | 7/2002 |
| JP | 2007-149343 | 6/2007 |

* cited by examiner

*Primary Examiner* — Hoan C Nguyen
(74) *Attorney, Agent, or Firm* — Hamre, Schumann, Mueller & Larson, P.C.

(57) ABSTRACT

A liquid crystal display device capable of efficiently obtaining a high brightness with reduced unevenness in brightness using a single light-emitting section is provided. The liquid crystal display device includes: a liquid crystal panel for controlling display by changing orientation of a liquid crystal composition; a single cylindrical light-source section (634); and a reflecting section (636) provided so that the single cylindrical light-source section is sandwiched between the reflecting section and the liquid crystal panel, for reflecting the light emitted from the single cylindrical light-source section (634) toward the liquid crystal panel, in which at least a part of a sectional shape of a reflecting surface of the reflecting section (636) in a cross section perpendicular to an axial direction of the single cylindrical light-source section (634) is formed based on a parabola whose focal point is a position of the single cylindrical light source section (634).

3 Claims, 9 Drawing Sheets

LIQUID CRYSTAL DISPLAY DEVICE HAVING REFLECTING SURFACE IN ZIGZAG MANNER WITH POLYGONAL LINE

CROSS-REFERENCE TO RELATED APPLICATION

The present application claims priority from Japanese application JP2009-267949 filed on Nov. 25, 2009, the content of which is hereby incorporated by reference into this application.

BACKGROUND OF THE INVENTION

1. Field of the Invention

The present invention relates to a liquid crystal display device, in particular, a liquid crystal display device having a direct-type backlight structure.

2. Description of the Related Art

FIG. 13 is an exploded perspective view of a conventional typical liquid crystal display module which is used for a television, a picture receiver, or the like. The upper side of FIG. 13 is the display screen side, whereas the lower side corresponds to a back surface of a liquid crystal display device.

A liquid crystal display module 900 includes a liquid crystal display panel 920 sandwiched between a backlight assembly 930 and an integral-type or separate-type bezel 910. The liquid crystal display panel 920 is obtained by assembly performed in a different step. The liquid crystal display module 900 is supported and fixed at a predetermined position by fastening means. In some cases, the liquid crystal display panel 920 is supported through an intermediation of an elastic body (not shown) between the liquid crystal display panel 920 and any one of the backlight assembly 930 and the bezel 910.

The backlight assembly 930 is obtained by supporting and fixing a backlight member at a predetermined position by fastening means so that the backlight member is sandwiched between an integral-type or separate-type resin frame 931 and a base plate 937. The backlight member includes: a plurality of optical sheets 932; a plurality of supporting members 935 for the optical sheets 932; a plurality of cathode fluorescent tubes 934 corresponding to light-emitting means; cathode fluorescent tube end covers 933; and a reflecting sheet 936 corresponding to light-reflecting means. The cathode fluorescent tube end covers 933 are located on the right and left sides of the liquid crystal display panel 920 and are capable of supporting the cathode fluorescent tube 934 so as to sandwich the cathode fluorescent tube 934 therebetween. On a back surface of the base plate 937, a cathode fluorescent tube lighting circuit board 938, which is electrically connected to the cathode fluorescent tubes 934, is mounted. Contrary to the liquid crystal display device using the large number of cathode fluorescent tubes as described above, a display device having a reduced number of cathode fluorescent tubes for display is sought after in response to recent requests for electric power saving and lower cost.

JP 2007-149343 A discloses the following light-source device to solve a problem of uneven brightness. The light-source device has a reflecting plate in the form of dual half-ellipses for each of a plurality of linear light sources corresponding to light-emitting means. Specifically, the cross-sectional shape of the reflecting plate has partial contours of two ellipses, which share a common focal point present directly above the linear light source.

JP 2002-196326 A discloses a backlight device to solve a problem of lowered light-emission efficiency of a light source corresponding to light-emitting means due to heat generated by the light source itself. In the backlight device, each of a plurality of cold cathode fluorescent tubes corresponding to the light-emitting means is located at a focal point of a parabolic cross section of a reflecting plate corresponding to light-reflecting means.

SUMMARY OF THE INVENTION

In the aforementioned display devices including the reduced number of cathode ray tubes, a lamp reflector corresponding to light-reflecting means has a convex portion in the vicinity of an intermediate portion between the plurality of fluorescent tubes corresponding to light-emitting means. Therefore, the shade due to the projecting portion of a convex cross section is generated by light emitted by the light-emitting means. As a result, unevenness in brightness sometimes disadvantageously occurs when the backlight is incorporated into the liquid crystal display module to perform display.

The present invention has been made in view of the aforementioned problems, and therefore has an object to provide a liquid crystal display device, which has a structure including a single light-emitting means with reduced unevenness in brightness to allow a high brightness to be efficiently obtained.

A liquid crystal display device of the present invention includes: a liquid crystal panel for controlling display by changing orientation of a liquid crystal composition; a single cylindrical light-source section for emitting light to the liquid crystal panel; and a reflecting section provided so that the single cylindrical light-source section is sandwiched between the reflecting section and the liquid crystal panel, for reflecting the light emitted from the single cylindrical light-source section toward the liquid crystal panel, in which at least a part of a sectional shape of a reflecting surface of the reflecting section in a cross section perpendicular to an axial direction of the single cylindrical light-source section is formed based on a parabola whose focal point is a position of the single cylindrical light source section.

Further, in the liquid crystal display device of the present invention, the sectional shape of the reflecting surface may include a polygonal line extending in a zigzag manner.

Further, in the liquid crystal display device of the present invention, the polygonal line may have vertices on the parabola.

Further, in the liquid crystal display device of the present invention, the polygonal line has a segment of radial straight lines extending from the focal point.

Further, in the liquid crystal display device of the present invention, the sectional shape of the reflecting surface may include: two end portions each formed by a parabolic curve; and a central portion formed by a polygonal line extending in a zigzag manner, wherein each of the line segments of the polygonal line intersects a line parallel to a screen of the liquid crystal panel.

Further, in the liquid crystal display device of the present invention, a gradient of one of the line segments of the polygonal line may be defined based on a gradient of a tangent of a virtual parabola obtained by extending the parabolic curves of the two end portions at a intersection point of the virtual parabola and a straight line which passes through the focal point and a vertex of the polygonal line.

Further, in the liquid crystal display device of the present invention, the reflecting section may be one of a metal base material and a synthetic resin base material, each having a small thickness, and the reflecting surface may be one of a white surface and a mirror surface.

DETAILED DESCRIPTION OF THE INVENTION

Figure 1:
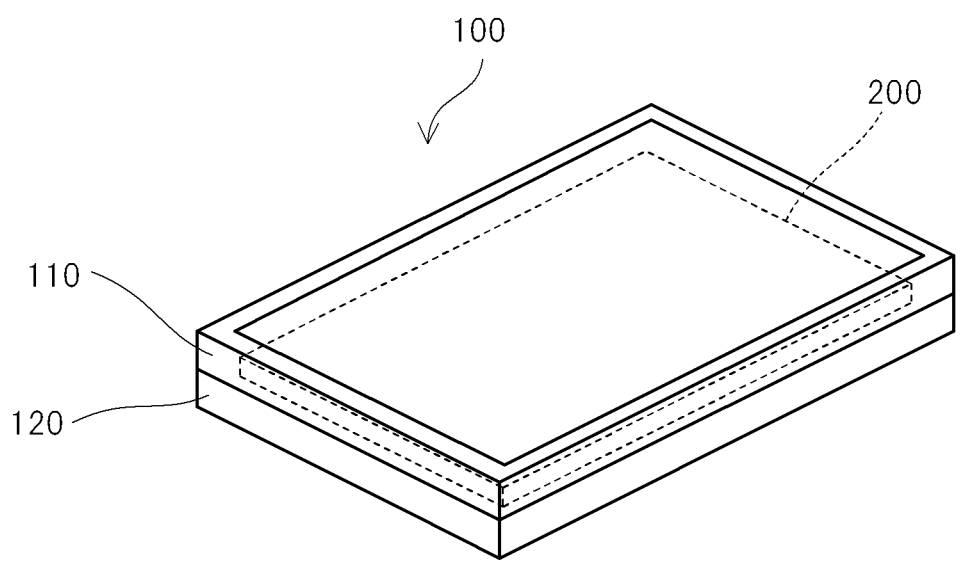
FIG. 1 is a view illustrating a liquid crystal display device according to a first embodiment of the present invention.

Hereinafter, embodiments of the present invention are described referring to the accompanying drawings. Throughout the drawings, the same or equivalent elements are denoted by the same reference numerals, and the overlapping description thereof is herein omitted.

First Embodiment

FIG. 1 is a view illustrating a liquid crystal display device 100 according to a first embodiment of the present invention. As illustrated in FIG. 1, the liquid crystal display device 100 includes: a liquid crystal module 200 including a liquid crystal panel; and an upper frame 110 and a lower frame 120. The upper frame 110 and the lower frame 120 fix the liquid crystal module 200 so as to sandwich the liquid crystal module 200 therebetween.

Figure 2:
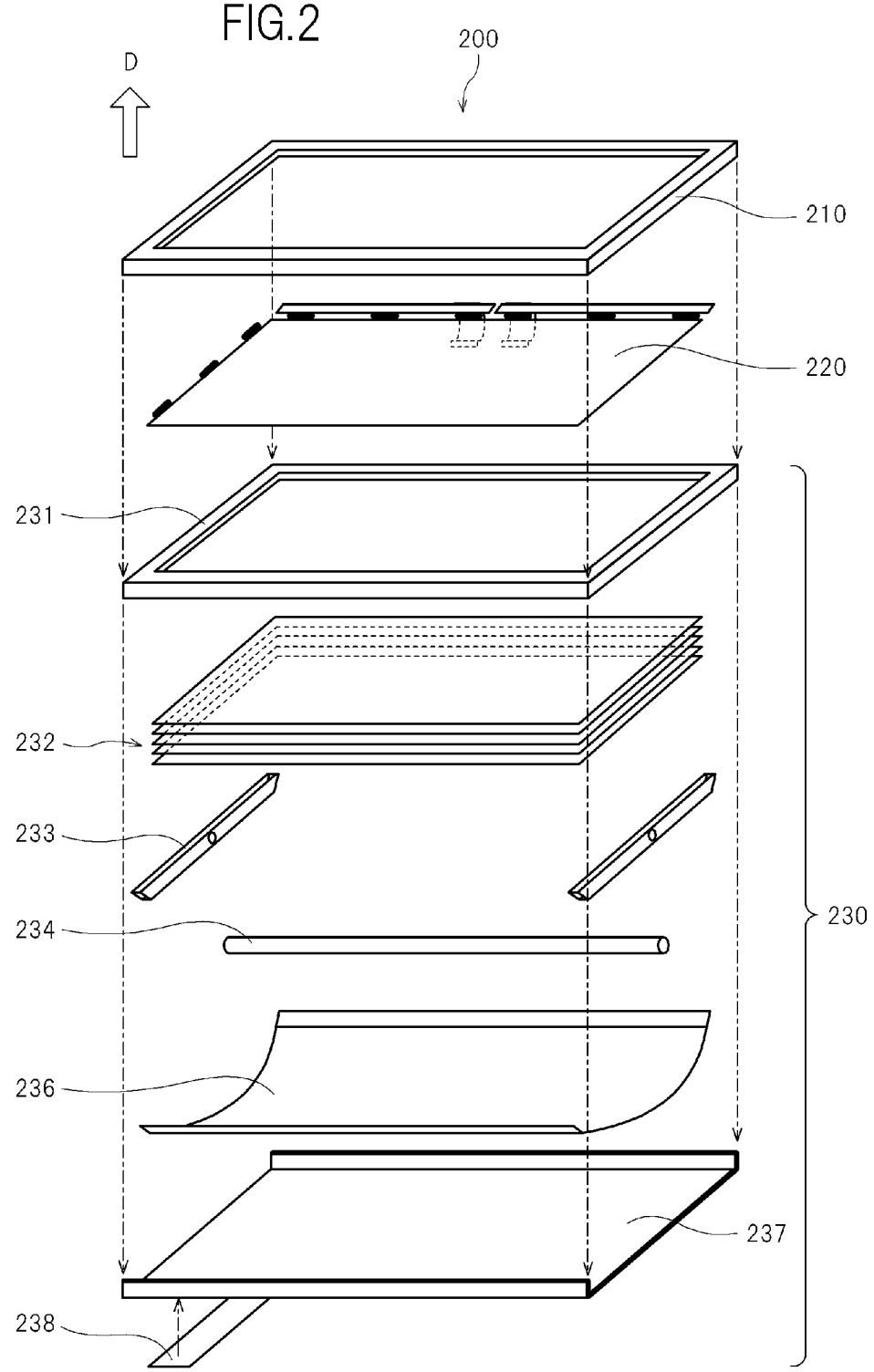
FIG. 2 is an exploded perspective view of a liquid crystal module illustrated in FIG. 1.

FIG. 2 is an exploded perspective view of the liquid crystal module 200. The liquid crystal module 200 includes: a bezel 210; a liquid crystal display panel 220; and a backlight assembly 230. The liquid crystal module 200 is supported and fixed at a predetermined position by fastening means. The liquid crystal display panel 220 may be supported through an intermediation of an elastic body (not shown) provided between the liquid crystal display panel 220 and either one of the backlight assembly 230 and the bezel 210.

The backlight assembly 230 is obtained by supporting and fixing a backlight member at a predetermined position with fastening means so that the backlight member is sandwiched between an integral-type or separate-type resin frame 231 and a base plate 237. The backlight member includes: at least one optical sheet 232; a single cathode fluorescent tube 234 corresponding to light-emitting means; cathode fluorescent tube end covers 233; and a reflecting sheet 236 corresponding to light-reflecting means. The cathode fluorescent tube end covers 233 are located on the right and left sides of the liquid crystal display panel 220 and are capable of supporting the cathode fluorescent tube 234 so as to sandwich the cathode fluorescent tube 234 therebetween. On a back surface of the base plate 237, a cathode fluorescent tube lighting circuit board 238 (inverter board) electrically connected to the cathode fluorescent tube 234 is mounted.

The reflecting sheet 236 is obtained by incorporating or applying a white reflector material having a high light-reflectivity to a synthetic resin base material or a metal base material, or by processing a metal base material to form a surface close to a mirror surface at least as a light-reflecting surface. In the case of viewing from D direction, the reflecting sheet 236 covers almost the entire area of the liquid crystal display panel 220. A center axis of the cathode fluorescent tube 234 corresponding to the light-emitting means is located approximately in the middle of a short side (having a length b) of the backlight assembly 230 as viewed from the screen direction D. A length of the cathode fluorescent tube 234 corresponds to a length of a long side of the backlight assembly 230.

Figure 3:
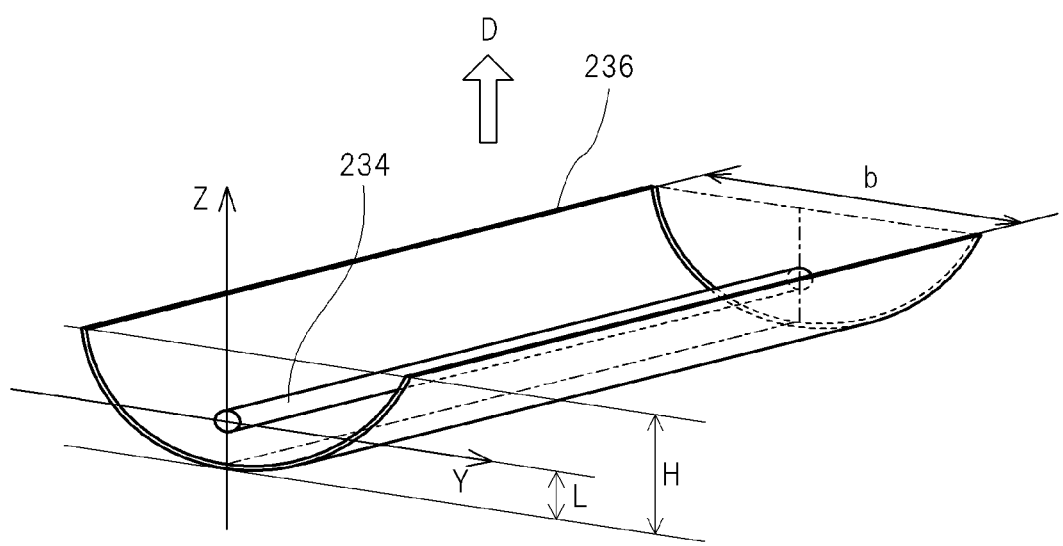
FIG. 3 is a view for illustrating the positional relation between a reflecting sheet and a cathode fluorescent tube of the liquid crystal display device according to the first embodiment of the present invention.

FIG. 3 is a view for illustrating the positional relation between the reflecting sheet 236 corresponding to the light-reflecting means and the cathode fluorescent tube 234 corresponding to the light-emitting means in the form of a single cylinder, in the backlight assembly 230. The reflecting sheet 236 has a parabolic sectional shape in a plane perpendicular to the center axis of the cathode fluorescent tube 234, and has plane-symmetric shape relating to a plane which is parallel to the screen direction D and includes the center axis. In the positional relation as described above, light emitted from the cathode fluorescent tube 234 corresponding to the light-emitting means can be efficiently directed in the screen direction D.

As illustrated in FIG. 3, a Y-Z coordinate system is considered, in which the screen direction D is a Z-direction, a direction perpendicular to the Z-direction in the plane perpendicular to the center axis of the cathode fluorescent tube 234 is a Y-direction, and the axis of the cathode fluorescent tube 234 is a point of origin. Then, the parabola is open to a positive direction of the Z-axis. Assume that a distance between an intersection point of the parabola with the Z-axis and the point of origin corresponding to the center of the cathode fluorescent tube 234 be L, a width of the reflecting sheet 236 in the Y-direction be b, and a height of the reflecting sheet 236 in the Z-direction be H. Then, a shape of the reflecting sheet 236 is expressed by the following Formula (1).

$$z = \frac{4H}{b^2} y^2 - L \quad (1)$$

where, $$-\frac{b}{2} \le y \le \frac{b}{2}$$

Further, conditions for making the point of origin, at which the cathode fluorescent tube 234 is located, identical with a focal point of the parabola expressed by Formula (1) so that the light emitted from the cathode fluorescent tube 234 is most efficiently directed in the screen direction D are expressed by Formula (2). Based on the conditions expressed by Formulae (1) and (2), an ideal sectional shape of the reflecting sheet 236 for making the center of the cathode fluorescent tube 234 identical with the focal point of the parabola is as expressed by Formula (3) obtained by rearranging Formulae (1) and (2).

$$H = \frac{b^2}{16L} \quad (2)$$

$$z = \frac{1}{4L} y^2 - L \quad (3)$$

With the arrangement as described above, the light emitted from the cathode fluorescent tube 234 can be directed in the screen direction D.

Second Embodiment

Figure 4:
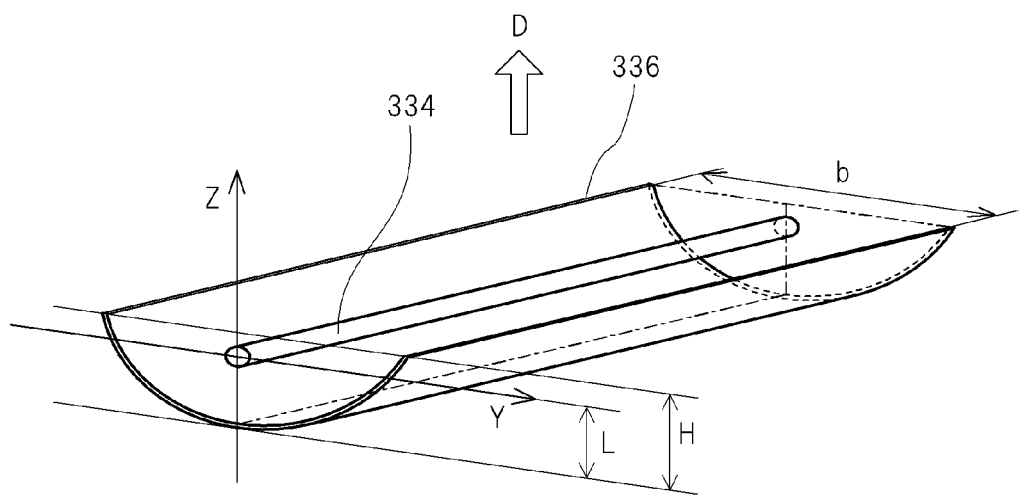
FIG. 4 is a view for illustrating the positional relation between a reflecting sheet and a cathode fluorescent tube of a liquid crystal display device according to a second embodiment of the present invention.

FIG. 4 is a view illustrating the positional relation between a reflecting sheet 336 corresponding to the light-reflecting means and a cathode fluorescent tube 334 corresponding to the light-emitting means in the form of a single cylinder, in a direct-type backlight of a liquid crystal display device according to a second embodiment of the present invention. The structures of the liquid crystal display device and the liquid crystal module according to the second embodiment are the same as those of the liquid crystal display device and the liquid crystal module according to the first embodiment, which are respectively illustrated in FIGS. 1 and 2. Therefore, the description thereof is herein omitted.

Figure 5:
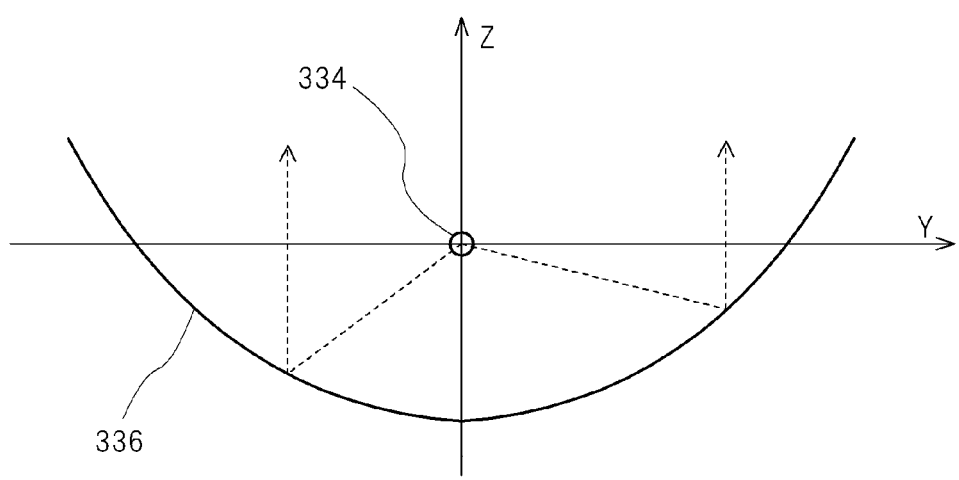
FIG. 5 is a view schematically illustrating a state where light is reflected with the positional relation illustrated in FIG. 4.

When the Z-direction height H of the reflecting sheet 236 of the liquid crystal display device according to the first embodiment is to be reduced, the distance L is set large as illustrated in FIG. 4 according to the relation expressed by Formula (2) described above. As a result, the overall height H of the reflecting sheet 336 can be reduced. FIG. 5 illustrates a state where the light emitted from the cathode fluorescent tube 334 is directed by the reflecting sheet 336 in the screen direction D.

Figure 6:
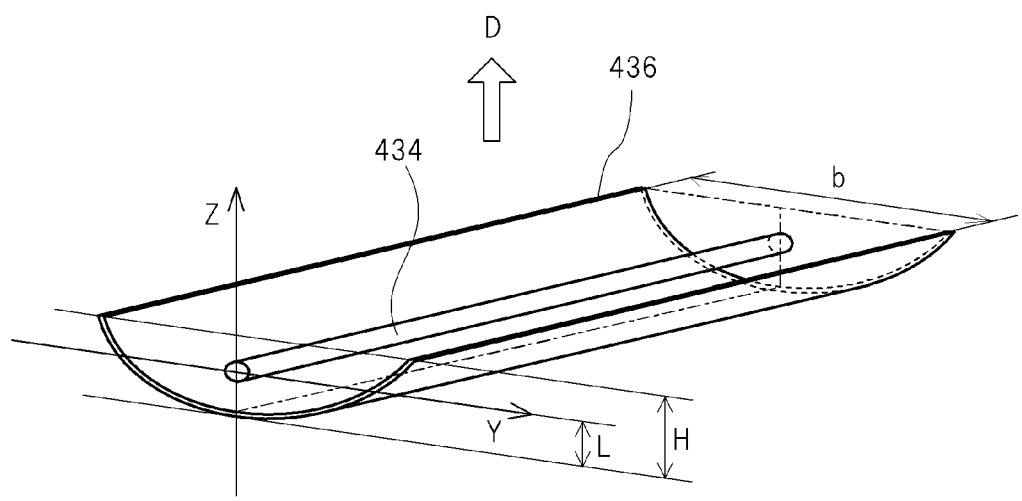
FIG. 6 is a view illustrating a comparative example for comparison with the positional relation between the reflecting sheet and the cathode fluorescent tube illustrated in FIG. 4.
Figure 7:
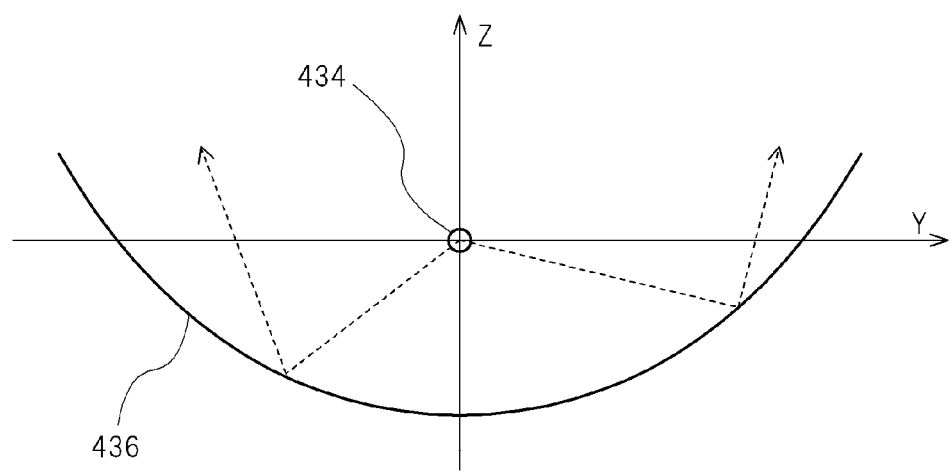
FIG. 7 is a view schematically illustrating a state where the light is reflected with the positional relation illustrated in FIG. 6.

FIG. 6 is a view illustrating a comparative example of the disposition of the reflecting sheet 436 and a cathode fluorescent tube 434 as the case where the parabolic shape of a reflecting sheet 436 is not satisfied with Formula (3). The value of overall height H in FIG. 6 is smaller as compared with the values of the overall height H, where the height H, the overall width b, and the distance L between the intersection point of the parabola with the Z-axis and the point of origin are satisfied with Formula (3). In this case, as illustrated in FIG. 7 illustrating a cross section in a plane parallel to the Y-Z plane of the reflecting sheet 436, the light emitted from the cathode fluorescent tube 434 is not directed in the screen direction D but diverges at a wider angle.

Third Embodiment

Figure 8:
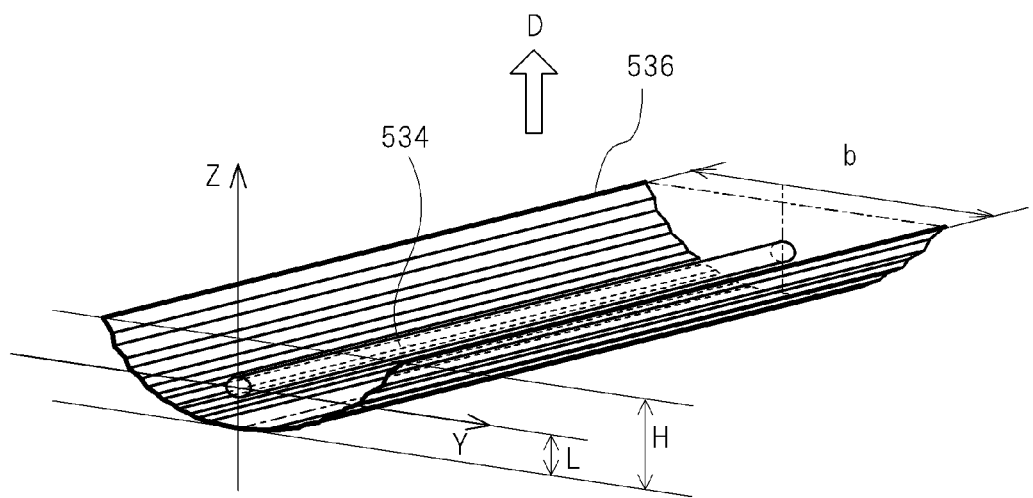
FIG. 8 is a view for illustrating the positional relation between a reflecting sheet and a cathode fluorescent tube of a liquid crystal display device according to a third embodiment of the present invention.
Figure 9:
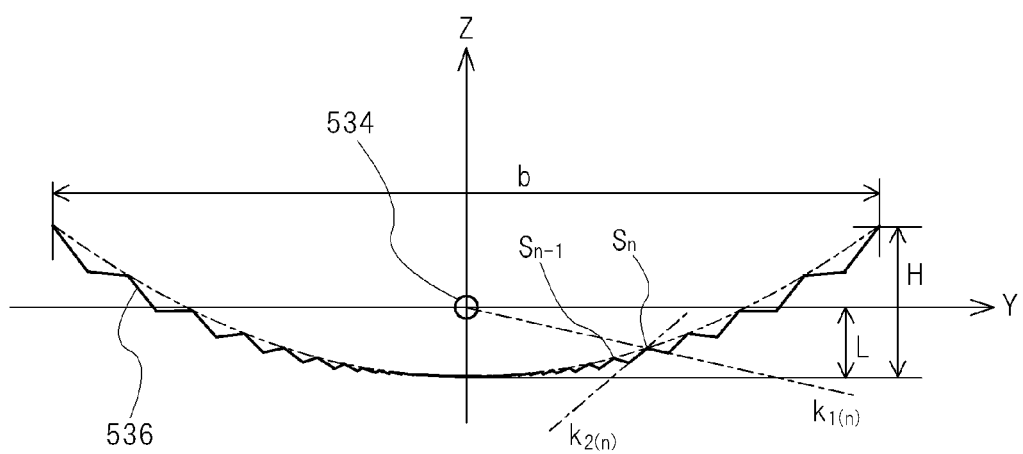
FIG. 9 is a view illustrating sectional shapes of the reflecting sheet and the cathode fluorescent tube in a Y-Z plane illustrated in FIG. 8.

FIG. 8 is a view illustrating the positional relation between a reflecting sheet 536 corresponding to the light-reflecting means and a cathode fluorescent tube 534 corresponding to the light-emitting means in the form of a single cylinder, in a direct-type backlight of a liquid crystal display device according to a third embodiment of the present invention. FIG. 9 is a view illustrating sectional shapes of the reflecting sheet 536 and the cathode fluorescent tube 534 illustrated in FIG. 8 when the reflecting sheet 536 and the cathode fluorescent tube 534 are cut along a plane parallel to the Y-Z plane. The structures of the liquid crystal display device and the liquid crystal module according to the third embodiment are the same as those of the liquid crystal display device and the liquid crystal module according to the first embodiment, which are respectively illustrated in FIGS. 1 and 2. Therefore, the description thereof is herein omitted.

As illustrated in FIG. 9, the sectional shape of the reflecting sheet 536 is formed with a polygonal line extending in a zigzag manner based on the parabola shape whose focal point is the position of the center axis of the cathode fluorescent tube 534. As illustrated in FIG. 9, a vertex $S_n$ which is an upward convex shape is located on the parabola expressed by Formula (3). A gradient $k_{1(n)}$, which is a gradient of one of the lines passing through the vertex $S_n$, is expressed by the following Formula (4) when the coordinates of the vertex $S_n$ are $(y_n, z_n)$. A gradient $k_{2(n)}$, which is a gradient of the other one of the lines passing through the vertex $S_n$, falls within the range expressed by the following Formula (5). The range expressed by the following Formula (5) is applied to the case where a value of y is positive. When y has a negative value, the obtained range is symmetrical to the range expressed by Formula (5) with respect to the Z-axis.

$$k_{1(n)} = \frac{z_n}{y_n} \quad (4)$$

$$\left(\frac{4Hy_{n-1}}{b^2} - \frac{L}{y_{n-1}}\right) + \sqrt{\left(\frac{4Hy_{n-1}}{b^2} - \frac{L}{y_{n-1}}\right)^2 + 1} \le \quad (5)$$

$$k_{2(n)} \le \left(\frac{4Hy_n}{b^2} - \frac{L}{y_n}\right) + \sqrt{\left(\frac{4Hy_n}{b^2} - \frac{L}{y_n}\right)^2 + 1}$$

The same effects are obtained with any number of steps of the reflecting sheet 536. A brightness is sufficiently high in the vicinity of a region immediately below the cathode fluorescent tube 534 corresponding to the light-emitting means. Therefore, the same effects are obtained even if the reflecting sheet 536 has a planar cross section in the vicinity of a region immediately below the cathode fluorescent tube 534 instead of the stepwise cross section.

In this third embodiment, a portion of the reflecting surface, which has the gradient $k_{1(n)}$, is approximately parallel to the light emitted from the cathode fluorescent tube 534, which therefore enables the reduction of a shade as much as possible. Moreover, a portion of the reflecting surface, which has the gradient $k_{2(n)}$, enables the light emitted from the cathode fluorescent tube 534 corresponding to the light-emitting means to be efficiently directed in the screen direction D.

Figure 10:
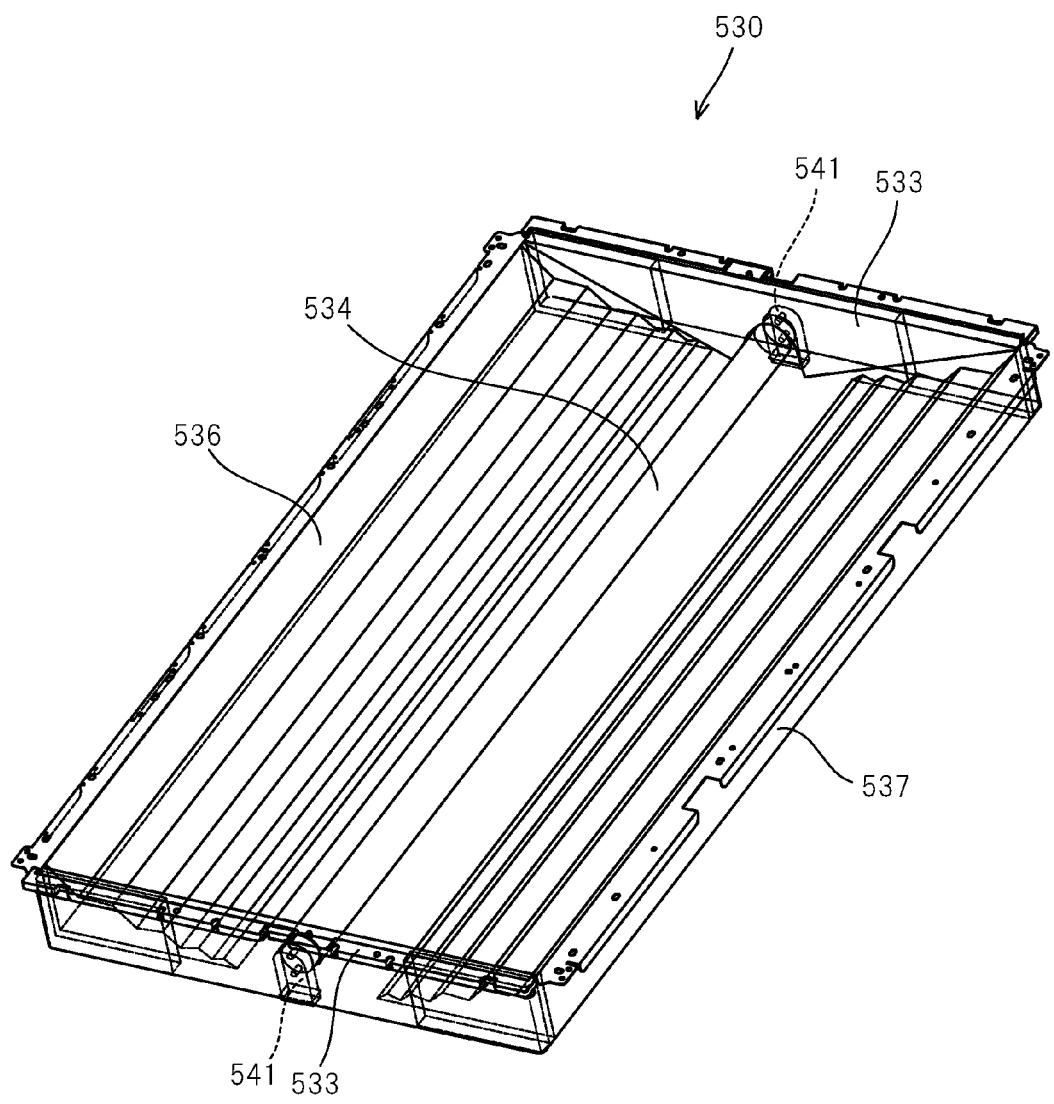
FIG. 10 is a perspective view illustrating a backlight assembly into which the reflecting sheet and the cathode fluorescent tube illustrated in FIG. 8 are incorporated.

FIG. 10 is a perspective view illustrating a backlight assembly 530 into which the reflecting sheet 536 and the cathode fluorescent tube 534 of this third embodiment are incorporated. In FIG. 10, the optical sheets and the supporting members therefor are omitted from a basic structure of the backlight assembly 530.

In FIG. 10, the cathode fluorescent tube 534 is supported in parallel to a long-side direction of a base plate 537 with cathode fluorescent tube sockets 541 fixed at predetermined positions of the base plate 537. At the same time, the cathode fluorescent tube 534 is electrically connected to the cathode fluorescent tube sockets 541. Ends of the cathode fluorescent tube 534 and the cathode fluorescent tube sockets 541 supporting the cathode fluorescent tube 534 are covered with cathode fluorescent tube end covers 533 placed on both short sides of the base plate 537. The cathode fluorescent tube end covers 533 also have a function to change the direction of the light, which originally direct at the short sides of the base plate, to the screen direction. The reflecting sheet 536 is placed so as to be symmetric in a short-side direction about the cathode fluorescent tube 534. Although the reflecting sheet 536 is in the form of a sheet in this embodiment, the same effects are obtained even if the reflecting sheet 536 has a block-like shape as long as the reflecting sheet 536 has a predetermined shape and can be fixed at a predetermined position.

Fourth Embodiment

Figure 11:
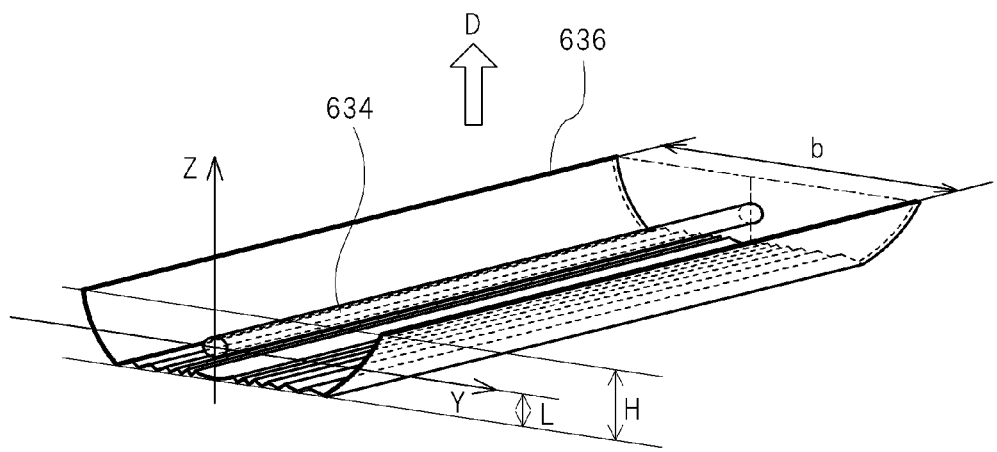
FIG. 11 is a view for illustrating the positional relation between a reflecting sheet and a cathode fluorescent tube of a liquid crystal display device according to a fourth embodiment of the present invention.
Figure 12:
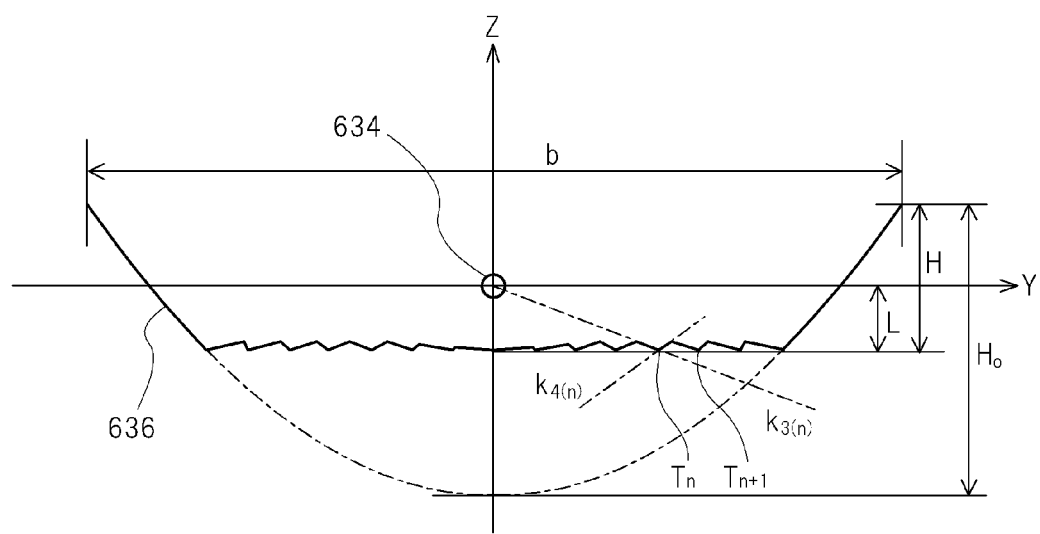
FIG. 12 is a view illustrating sectional shapes of the reflecting sheet and the cathode fluorescent tube in the Y-Z plane illustrated in FIG. 11.
Figure 13:
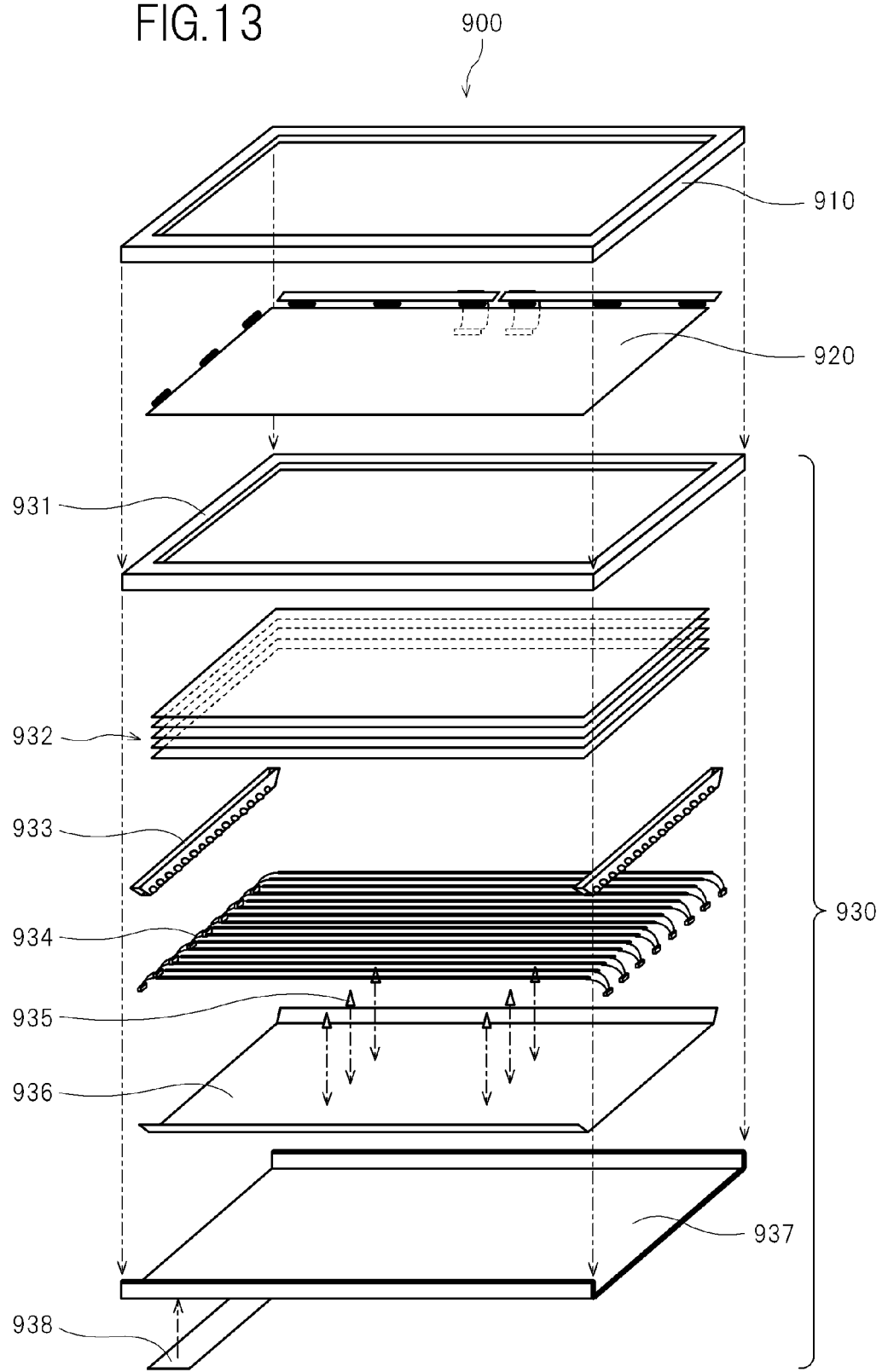
FIG. 13 is an exploded perspective view of a conventional liquid crystal display module.

FIG. 11 is a view illustrating the positional relation between a reflecting sheet 636 corresponding to the light-reflecting means and a cathode fluorescent tube 634 corresponding to the light-emitting means in the form of a single cylinder, in a direct-type backlight of a liquid crystal display device according to a fourth embodiment of the present invention. FIG. 12 is a view illustrating sectional shapes of the reflecting sheet 636 and the cathode fluorescent tube 634 illustrated in FIG. 11 when the reflecting sheet 636 and the cathode fluorescent tube 634 are cut along a plane parallel to the Y-Z plane. The structures of the liquid crystal display device and the liquid crystal module according to the fourth embodiment are the same as those of the liquid crystal display device and the liquid crystal module according to the first embodiment, which are respectively illustrated in FIGS. 1 and 2. Therefore, the description thereof is herein omitted.

As illustrated in FIG. 12, the reflecting sheet 636 is formed in a partial parabolic sectional shape whose focal point is the position of a center axis of the cathode fluorescent tube 634 in the vicinity of each of both ends thereof and formed in a shape of a polygonal line extending in a zigzag manner in the vicinity of the center.

As illustrated in FIG. 12, assume that a Z-direction height of a parabola obtained by extending the partial parabolas forming both ends of the reflecting sheet 636 be $H_0$, a formula equivalent to Formula (2) is expressed as Formula (6) by using H, L, and b illustrated in FIG. 12. The parabola is expressed by Formula (7).

$$H_0 = \frac{b^2}{16\{H_0 - (H-L)\}} \quad (6)$$

$$z = \frac{4H_0}{b^2} y^2 - \frac{b^2}{16H_0} \quad (7)$$

Here, in consideration of the passage of the parabola expressed by Formula (7) through a point (b/2, H−L) on the coordinates, $H_0$ is defined as expressed by Formula (8), where $y \leq 0$. As a result, the shape of the partial parabolas in the vicinity of both ends of the reflecting sheet 636 is expressed by Formula (9).

$$H_0 = \frac{1}{2}\left\{(H-L) + \sqrt{(H-L)^2 + \left(\frac{b}{2}\right)^2}\right\} \quad (8)$$

$$z = \frac{2}{b^2}\left\{(H-L) + \sqrt{(H-L)^2 + \left(\frac{b}{2}\right)^2}\right\}y^2 + \quad (9)$$

$$\frac{1}{2}\left\{(H-L) - \sqrt{(H-L)^2 + \left(\frac{b}{2}\right)^2}\right\}$$

where, $$\sqrt{\left(\frac{b}{2}\right)^2 + 2H\left\{(H-L) - \sqrt{(H-L)^2 + \left(\frac{b}{2}\right)^2}\right\}} \leq |y| \leq \frac{b}{2}$$

On the other hand, a range of the y-coordinate of the stepwise portion in the vicinity of the center of the reflecting sheet 636 is expressed by Formula (10). In the range expressed by Formula (10), assume that coordinates of a vertex $T_n$ forming a downward convex shape be $(y_n, z_n)$ where $z_n$ is −L. Then, a gradient $k_{3(n)}$, which is a gradient of one of the lines passing through the vertex $T_n$, is expressed by Formula (11). The gradient $k_{4(n)}$, which is a gradient of the other one of the lines passing through the vertex $T_n$, has a value between the gradient of a tangent of one of the partial parabolas at the intersection point of a straight line, which passes through the point of origin and the vertex $T_n$, and the partial parabolas expressed by Formula (9) and the gradient of a tangent of the partial parabola at the intersection point of a straight line, which passes through the point of origin and a vertex $T_{n+1}(y_n, z_n)$ where $Z_n$ is −L, and the parabolas expressed by Formula (9). Therefore, the gradient $k_{4(n)}$ is present in a range expressed by Formula (12).

$$0 \leq |y| \leq \sqrt{\left(\frac{b}{2}\right)^2 + 2H\left\{(H-L) - \sqrt{(H-L)^2 + \left(\frac{b}{2}\right)^2}\right\}} \quad (10)$$

$$k_{3(n)} = -\frac{L}{y_n} \quad (11)$$

$$-\frac{L}{y_n} + \sqrt{\left(\frac{L}{y_n}\right)^2 + 1} \leq k_{4(n)} \leq -\frac{L}{y_{n+1}} + \sqrt{\left(\frac{L}{y_{n+1}}\right)^2 + 1} \quad (12)$$

As in the third embodiment, the same effects are obtained with any number of steps of the stepwise portion of the reflecting sheet 636. Moreover, a brightness is sufficiently high in the vicinity of a region immediately below the cathode fluorescent tube 634 corresponding to the light-emitting means. Therefore, the same effects are obtained even if the reflecting sheet 636 has a planar cross section instead of the stepwise cross section.

With the structure as described above, a thickness of the liquid crystal module can be further reduced. In addition, according to each of the embodiments described above, even with the single light-emitting means, a high brightness can be efficiently obtained without generating a shade or unevenness in brightness. Further, in the direct-type backlight structure, a reduction in cost as well as in thickness of the liquid crystal display module can be realized.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device, comprising: a liquid crystal panel for controlling display by changing orientation of a liquid crystal composition; a single cylindrical light-source section for emitting light to a An overall area of the liquid crystal panel; and a reflecting section provided so that the single cylindrical light-source section is sandwiched between the reflecting section and the liquid crystal panel, for reflecting the light emitted from the single cylindrical light-source section toward the liquid crystal panel, wherein at least a part of a sectional shape of a reflecting surface of the reflecting section in a cross section perpendicular to an axial direction of the single cylindrical light-source section is formed based on a parabola whose focal point is a position of the single cylindrical light source section, the ENTIRE sectional shape of the reflecting surface includes a polygonal line extending in a zigzag manner, and the polygonal line has a segment of radial straight lines extending from the focal point.

2. The liquid crystal display, device according to claim 1, wherein the polygonal line has vertices on the parabola.

3. The liquid crystal display device according to claim 1, wherein the sectional shape of the reflecting surface includes: two end portions each formed by a parabolic curve; and a central portion formed by a polygonal line extending in a zigzag manner, wherein each of the line segments of the polygonal line intersects a line parallel to a screen of the liquid crystal panel.

* * * * *